(12) United States Patent
Hikmet et al.

(10) Patent No.: US 9,921,353 B2
(45) Date of Patent: Mar. 20, 2018

(54) LIGHT EMITTING DEVICE

(71) Applicant: PHILIPS LIGHTING HOLDING B.V., Eindhoven (NL)

(72) Inventors: Rifat Ata Mustafa Hikmet, Eindhoven (NL); Dirk Kornelis Gerhardus De Boer, Den Bosch (NL); Ties Van Bommel, Horst (NL); Wilhelmina Maria Hardeman, Eindhoven (NL); Marcus Antonius Verschuuren, Berkel-Enschot (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 214 days.

(21) Appl. No.: 14/898,167

(22) PCT Filed: Jun. 5, 2014

(86) PCT No.: PCT/EP2014/061667
§ 371 (c)(1),
(2) Date: Dec. 14, 2015

(87) PCT Pub. No.: WO2014/198619
PCT Pub. Date: Dec. 18, 2014

(65) Prior Publication Data
US 2016/0131813 A1 May 12, 2016

(30) Foreign Application Priority Data
Jun. 14, 2013 (EP) .................... 13171986

(51) Int. Cl.
*F21V 8/00* (2006.01)
*G03B 21/20* (2006.01)

(52) U.S. Cl.
CPC ......... *G02B 6/0003* (2013.01); *G02B 6/0018* (2013.01); *G02B 6/0035* (2013.01);
(Continued)

(58) Field of Classification Search
CPC .. G02B 6/0003; G02B 6/0035; G02B 6/0018; G02B 6/0041; G02B 6/0076; G02B 6/005; G03B 21/208
See application file for complete search history.

(56) References Cited

U.S. PATENT DOCUMENTS 7,982,229 B2 7/2011 Bechtel et al.
8,227,828 B2 7/2012 Li et al.
(Continued)

FOREIGN PATENT DOCUMENTS

WO 2003009012 A2 1/2003
WO 2006054203 A1 5/2006
(Continued)

*Primary Examiner* — David V Bruce

(57) ABSTRACT

A light emitting device (1) comprising a light source (2) adapted for, in operation, emitting light (13) with a first spectral distribution, a first light guide (3) comprising a first light input surface (31) and a first light exit surface (32) arranged opposite to one another, and further comprising an end surface (35) extending perpendicular with respect to the first light input surface (31), and a second light guide (4) comprising a second light input surface (41) and a second light exit surface (42) extending perpendicular with respect to one another. The first light guide (3) is adapted for receiving the light with the first spectral distribution from the light source (2) at the first light input surface (31), guiding the light with the first spectral distribution to the first light exit surface (32) and to the end surface (35) and coupling a part of the light with the first spectral distribution out of the first light exit surface (32) into the second light guide (4) and coupling another part of the light with the first spectral distribution out of the end surface (35). The second light guide (4) is adapted for receiving light with the first spectral distribution coupled out of the first light guide (3) at the second light input surface (41), guiding the light to the second light exit surface (42), converting at least a part of the (Continued)

light (13) with the first spectral distribution to light (14) with a second spectral distribution and coupling the light with the second spectral distribution out of the second light exit surface (42).

15 Claims, 9 Drawing Sheets

(52) U.S. Cl.
CPC ......... *G02B 6/0041* (2013.01); *G02B 6/0076* (2013.01); *G03B 21/208* (2013.01); *G02B 6/005* (2013.01)

(56) References Cited

U.S. PATENT DOCUMENTS

| | | |
|---|---|---|
| 2007/0195278 A1* | 8/2007 | Yokote ............... G03B 21/2033 353/34 |
| 2008/0232084 A1 | 9/2008 | Kon |
| 2011/0062469 A1 | 3/2011 | Camras et al. |
| 2011/0240120 A1 | 10/2011 | Ronda et al. |
| 2012/0086028 A1 | 4/2012 | Beeson et al. |

FOREIGN PATENT DOCUMENTS

| | | |
|---|---|---|
| WO | 2012056382 A1 | 5/2012 |
| WO | 2012145960 A1 | 11/2012 |
| WO | 2012146960 A1 | 11/2012 |

\* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2014/061667, filed on Jun. 5, 2014, which claims the benefit of European Patent Application No. 13171986.6, filed on Jun. 14, 2013. These applications are hereby incorporated by reference herein.

FIELD OF THE INVENTION

The invention relates to a light emitting device comprising a light source adapted for, in operation, emitting light with a first spectral distribution and a light guide adapted for converting the light with the first spectral distribution to light with a second spectral distribution.

BACKGROUND OF THE INVENTION

High intensity light sources, and particularly white high intensity light sources, are interesting for various applications including spots and digital light projection. For such purposes, it is possible to make use of so-called light concentrators where shorter wavelength light is converted to longer wavelengths in a highly transparent luminescent material. Such a transparent luminescent material is illuminated by LEDs to produce longer wavelengths within the luminescent material. Converted light, which will be waveguided in the luminescent material, is extracted from a surface leading to an intensity gain.

Document WO 2012/056382 A1 describes in one embodiment a lighting device for such a purpose comprising more than one waveguide, of which one or more may be provided with a luminescent material arranged on or in the waveguide and configured to convert light from a light source into luminescent material emission.

However, in such a lighting device converted light which does not get coupled into the wave guide escapes from the side surfaces and this light gets lost resulting in a reduced efficiency.

Document WO 2006/054203 describes a light emitting device with a conversion structure which absorbs light from, in general blue, LEDs, converts it to light with longer wavelengths and guides it to an exit surface. In the conversion structure, nearly all blue light is converted into light of longer wavelengths. Any non-converted light, i.e. light remaining blue, is transmitted and not guided to the light exit surface, thereby resulting in loss of light and a reduced efficiency.

For a white light source, however, the presence of blue light as a part of the emission from the light exit surface is desired as well.

That is, both mentioned prior art documents describe devices in which an excessive amount of light loss occurs thereby compromising the intensity of the emitted light. Furthermore, for both prior art devices, the spectral distribution of the emitted light covers a too narrow wavelength region and is thus inadequate, particularly when used for white light sources.

WO2012/146960A1 describes an optical fiber which receives and guides a primary light in a longitudinal direction. Scattering structures in the optical fiber re-direct the primary light out of the optical fiber in the transverse direction into a photo-luminescent layer which converts the primary light to secondary light having a different wavelength than the primary light resulting in white light exiting the photo-luminescent layer.

US2008/0232084A1 describes a white light source device comprising a condenser lens which condenses light emitted from a blue LED source to enter an entrance face of a rod lens in which the light propagates and reducing the unevenness in brightness. At the exit surface of the rod lens a fluorescent material is arranged which results in white light.

SUMMARY OF THE INVENTION

It is an object of the present invention to overcome this problem, and to provide a light emitting device with which the loss of light is minimized and, particularly, with which the spectral distribution of the emitted light covers a broader wavelength region and with which non-converted light, particularly blue light, is collected and guided towards a light exit surface of the light emitting device.

According to the invention, this and other objects are achieved by means of a light emitting device comprising a light source adapted for, in operation, emitting light with a first spectral distribution, a first light guide comprising a first light input surface and a first light exit surface arranged opposite to one another, and further comprising an end surface extending perpendicular with respect to the first light input surface, and a second light guide comprising a second light input surface and a second light exit surface extending perpendicular with respect to one another, the first light guide being adapted for receiving the light with the first spectral distribution from the light source at the first light input surface, guiding the light with the first spectral distribution to the first light exit surface and to the end surface and coupling a part of the light with the first spectral distribution out of the first light exit surface into the second light guide and coupling another part of the light with the first spectral distribution out of the end surface, and the second light guide being adapted for receiving the light with the first spectral distribution coupled out of the first light guide at the second light input surface, guiding the light to the second light exit surface, converting at least a part of the light with the first spectral distribution to light with a second spectral distribution and coupling the light with the second spectral distribution out of the second light exit surface.

The provision of a first light guide arranged between the light source and the converting second light guide results in that the converting second light guide is arranged as a secondary layer which absorbs at least the light escaping from the first light exit surface of the first light guide and converts this light to light with another spectral distribution. In this way light, which would otherwise be lost, can be used to produce a second color which can then be extracted from the light exit surface of the second waveguide which is perpendicular with respect to the light input surface. Thus light with another color and with high intensity concentrated light is provided. In this way, a multi-color high intensity light source with improved efficiency can be produced. Thereby a light emitting device is provided in which light loss is minimized or even eliminated altogether.

The provision of a first light guide furthermore provides an element for collecting non-converted, particularly blue, light and guiding this light towards the end surface of the first light guide. Thereby a lighting device emitting light of a spectral distribution in which blue light is included, is provided. This in turn provides for a light emitting device which emits light with an improved and broader spectral distribution, and which is particularly suitable for use as a white light source.

In an embodiment the first light guide is a transparent light guide. Thereby a light emitting device is provided with which the collection of non-converted, particularly blue, light is further improved as less or even no light is absorbed in the first light guide.

The term "transparent light guide" in this connection is meant to encompass light guides made of materials having a transparency of at least 85%, alternatively a transparency of at least 90%, alternatively a transparency of at least 95% or alternatively a transparency of at least 99%.

In an embodiment the first light guide is a transparent substrate in or on which substrate a solid state light source such as a LED is manufactured. The solid state light source may be manufactured in any feasible manner known in the art, such as by a chemical or physical deposition method or by Liquid Phase Epitaxy (LPE), the manufacture or growing of the solid state light emitting devices being carried out directly onto the transparent substrate. The solid state light source is arranged in direct physical and optical contact with the transparent substrate, preferably by providing that e.g. the active layers of the solid state light emitting devices are grown, directly onto the transparent substrate and are processed, e.g. etched, directly on the transparent substrate. In other words, the transparent substrate is the substrate on which the solid state light source, i.e. the active layers of the solid state light source, are manufactured. Suitable manufacturing techniques are applied to provide a separation, or gap, between neighboring or adjacent solid state light sources. A particularly preferred material for the transparent substrate is doped or undoped sapphire. The transparent substrate may alternatively be made of a doped or undoped garnet, suitable garnets being described above. Furthermore, the transparent substrate may be luminescent, light concentrating or a combination thereof, suitable materials being described above.

In an embodiment the first light guide is adapted for converting at least a part of the light with the first spectral distribution to light with a third spectral distribution and guiding the light with the third spectral distribution to the first light exit surface and to the end surface and coupling a part of the light with the third spectral distribution out of the first light exit surface into the second light guide and coupling another part of the light with the third spectral distribution out of the end surface, and the second light guide is adapted for receiving at least a part of the light with the third spectral distribution coupled out of the first light guide at the second light input surface, guiding the light to the second light exit surface, converting at least a part of the light with the third spectral distribution to light with the second spectral distribution and coupling the light with the second spectral distribution out of the second light exit surface.

Thereby a lighting device is provided which emits light of a spectral distribution in which an additional color of light is included. This in turn provides, in particular, for a light emitting device with a further broadened and thus improved spectral distribution of the emitted light and which is therefore particularly usable as a white light source.

In an embodiment one of the first light guide and the second light guide is at least partly enclosed by the respective other of the first light guide and the second light guide. Thereby a light emitting device is provided with which non-converted, particularly blue, light is collected in a particularly efficient manner from more than one surface of the first or second light guide, as the case may be.

In an embodiment the light emitting device further comprises one or more further light guides arranged on the second light guide and comprising a further light input surface and a further light exit surface extending perpendicular with respect to one another, the one or more further light guides being adapted for receiving and coupling in incident light at the further light input surface from the second light guide, guiding the incident light to the further light exit surface, converting at least a part of the incident light to converted light with a spectral distribution being different from that of the incident light and coupling the converted light out of the further light exit surface. For example the further light guide couples in light escaping from a surface of the second light guide other than the second light exit surface. Thereby a lighting device emitting light is provided with a spectral distribution in which one or more further additional colors of light may be selected to be included. This in turn provides for a light emitting device with an improved spectral distribution of the emitted light and which is therefore particularly usable as a white light source or alternatively as a multi-color light source with a high intensity. Also, this embodiment enables to tune the intensity of the different colors based on the order in which the light guides are arranged in the light emitting device.

In an embodiment the light emitting device further comprises a further light guide arranged in between the light source and the first light guide and comprising a further light input surface and a further end surface extending perpendicular with respect to one another, and a further light exit surface opposite to the further light input surface, the further light guide being adapted for receiving and coupling in incident light from the light source, converting at least a part of the incident light to converted light with a spectral distribution being different from that of the incident light, guiding the incident light and/or the converted light to the further light exit surface and to the further end surface, coupling the incident light and/or the converted light out of the further light exit surface into the first light guide and out of the further end surface. Thereby a light emitting device is provided with a further possibility for tuning the intensity of the respective colors of light emitted by the light emitting device.

In an embodiment the first light input surface of the first light guide comprises a coupling structure for a more efficient incoupling of light. In an embodiment, the coupling structure is any one of a refractive structure and a diffractive structure. Thereby a light emitting device is provided with which non-converted light, particularly blue light, is collected and guided towards a light exit surface of the light emitting device in a particularly efficient and well-functioning manner, and with which the amount of light coupled into the first light guide may be tuned.

In an embodiment the light emitting device further comprises a layer arranged between the first light guide and the second light guide, the layer being of a material having a refractive index, which is lower than the refractive index of both the first light guide and the second light guide. Thereby a light emitting device is provided with which coupling of light between the first and second light guide is achieved in a particularly efficient way by further lowering or even eliminating light losses occurring in the coupling process/transport of light between the first and the second light guide.

In an embodiment the second light guide comprises a luminescent material. Thereby a light emitting device is provided having particularly good and efficient light converting properties.

In an embodiment the light emitting device further comprises a coupling medium arranged between the light source and the first light guide. Thereby a light emitting device is provided with which light emitted by the light sources may be coupled into the first light guide in a particularly efficient manner and with particularly low or possibly no coupling losses.

In an embodiment any one or more of the first light guide and the second light guide comprise at least one scattering element. Thereby a light emitting device is provided with which light may be extracted from the respective light guides in a particularly efficient manner and with which a uniform light distribution as perceived by a viewer may be obtained.

In an embodiment any one or more of the first light guide and the second light guide at the first light exit surface and the second light exit surface, respectively, comprise a coupling structure for a more efficient outcoupling of light. Thereby a light emitting device is provided with which light may be extracted from the respective light guides in a particularly efficient manner and with particularly low or possibly even no coupling losses.

In an embodiment the first light guide and the second light guide are at least partially in one or more of optical and mechanical contact with one another. Thereby a light emitting device is provided with which coupling of light between the first and second light guide is achieved in a particularly efficient way by further lowering or even eliminating light losses occurring in the coupling process.

In an embodiment the remaining surfaces of the first light guide and/or the second light guide are covered with a reflective material. This improves the light output and reduces the loss of light out of surfaces of the light guides that are not intended for light exiting. The remaining surfaces of the light guides are the surfaces other than surfaces which are intended to be light input or light exit surfaces.

The invention also relates to a digital projection device comprising a light emitting device according to any one of the embodiments according to the invention.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

Figure 1:
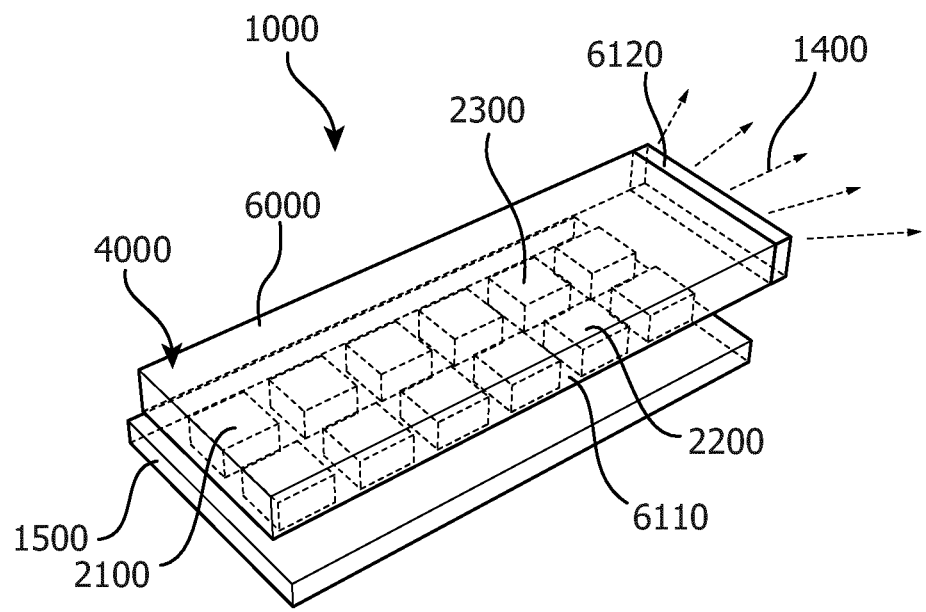
FIG. 1 shows a 3-dimensional perspective view of a light emitting device comprising an exit phosphor.

As illustrated in the figures, the sizes of layers, elements and regions are exaggerated for illustrative purposes and, thus, are provided to illustrate the general structures of embodiments of the present invention. Like reference numerals refer to like elements throughout, such that e.g. a light emitting device according to the invention is generally denoted 1, whereas different specific embodiments thereof are denoted by adding 01, 02, 03 and so forth to the general reference numeral. With regard to FIGS. 1 to 8 showing a number of features and elements which may be added to any one of the embodiments of a light emitting device according to the invention as set forth further below, generally "00" has been added to all elements except those specific to one of these Figures.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The following description will start with general considerations regarding applications, suitable light sources and suitable materials for various elements and features of a light emitting device according to the invention. For this purpose a number of features and elements which may be added to any one of the embodiments of a light emitting device according to the invention as set forth further below will be described with reference to FIGS. 1 to 8. The specific embodiments of a light emitting device according to the invention will be described in detail with reference to FIGS. 9 to 16.

A light emitting device according to the invention may be used in applications including but not being limited to a lamp, a light module, a luminaire, a spot light, a flash light, a projector, a digital projection device, automotive lighting such as e.g. a headlight or a taillight of a motor vehicle, arena lighting, theater lighting and architectural lighting.

Light sources which are part of the embodiments according to the invention as set forth below, are adapted for, in operation, emitting light with a first spectral distribution. This light is subsequently coupled into a light guide or waveguide. The light guide or waveguide may convert the light of the first spectral distribution to another spectral distribution and guides the light to an exit surface. The light source may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs. The LED may in principle be an LED of any color, but is in an embodiment a blue light source producing light source light in the blue color-range which is defined as a wavelength range of between 380 nm and 495 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light source may be a red light source, i.e. emitting in a wavelength range of e.g. between 600 nm and 800 nm. Such a red light source may be e.g. a light source of any of the above mentioned types directly emitting red light or provided with a phosphor suitable for converting the light source light to red light. This embodiment is particularly advantageous in combination with a light guide adapted for converting the light source light to infrared (IR) light, i.e. light with a wavelength of more than about 800 nm and in a suitable embodiment with a peak intensity in the range from 810 to 850 nm. In an embodiment such a light guide comprises an IR emitting phosphor. A light emitting device with these characteristics is especially advantageous for use in night vision systems, but may also be used in any of the applications mentioned above.

The light guides as set forth below in embodiments according to the invention generally may be rod shaped or bar shaped light guides comprising a height H, a width W, and a length L extending in mutually perpendicular directions and are in embodiments transparent, or transparent and luminescent. The light is guided generally in the length L direction. The height H is preferably <10 mm, more preferably <5 mm, most preferably <2 mm. The width W is preferably <10 mm, more preferably <5 mm, most preferably <2 mm. The length L is preferably larger than the width W and the height H, more preferably at least 2 times the width W or 2 times the height H, most preferably at least 3 times the width W or 3 times the height H. The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

The generally rod shaped or bar shaped light guide can have any cross sectional shape, but in embodiments has a cross section the shape of a square, rectangle, round, oval, triangle, pentagon, or hexagon. Generally the light guides are cuboid, but may be provided with a different shape than a cuboid, with the light input surface having somewhat the shape of a trapezoid. By doing so, the light flux may be even enhanced, which may be advantageous for some applications.

The light guides may also be cylindrically shaped rods. In embodiments the cylindrically shaped rods have one flattened surface along the longitudinal direction of the rod and at which the light sources may be positioned for efficient incoupling of light emitted by the light sources into the light guide. The flattened surface may also be used for placing heat sinks. The cylindrical light guide may also have two flattened surfaces, for example located opposite to each other or positioned perpendicular to each other. In embodiments the flattened surface extends along a part of the longitudinal direction of the cylindrical rod.

The light guides as set forth below in embodiments according to the invention may also be folded and/or bended in the length direction such that the light guide is not a straight, linear bar or rod, but may comprise, for example, a rounded or straight corner in the form of a 90 or 180 degrees bend, or may have a U-shape, a circular or elliptical shape, a loop shape or a 3-dimensional spiral shape having multiple loops. This provides for a compact light guide of which the total length, along which generally the light is guided, is relatively large, leading to a relatively high lumen output, but can at the same time be arranged into a relatively small space. For example luminescent parts of the light guide may be rigid while transparent parts of the light guide are flexible to provide for the shaping of the light guide along its length direction. The light sources may be placed on any suitable location along the length of the folded and/or bended light guide.

Suitable materials for the light guides as set forth below according to embodiments of the invention are sapphire, polycrystalline alumina and/or undoped transparent garnets such as YAG, LuAG having a refractive index of n=1.7. An additional advantage of this material (above e.g. glass) is that it has a good thermal conductivity, thus diminishing local heating. Other suitable materials include, but are not limited to, glass, quartz and transparent polymers. In other embodiments the light guide material is lead glass. Lead glass is a variety of glass in which lead replaces the calcium content of a typical potash glass and in this way the refractive index can be increased. Ordinary glass has a refractive index of n=1.5, while the addition of lead produces a refractive index ranging up to 1.7.

The light guides as set forth below according to embodiments of the invention may comprise a suitable luminescent material for converting the light to another spectral distribution. Suitable luminescent materials include inorganic phosphors, such as doped YAG, LuAG, organic phosphors, organic fluorescent dyes and quantum dots which are highly suitable for the purposes of embodiments of the present invention as set forth below.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS$_2$) and/or silver indium sulfide (AgInS$_2$) can also be used. Quantum dots show very narrow emission band and thus they show saturated colors. Furthermore the emission color can easily be tuned by adapting the size of the quantum dots. Any type of quantum dot known in the art may be used in embodiments of the present invention as set forth below. However, it may be preferred for reasons of environmental safety and concern to use cadmium-free quantum dots or at least quantum dots having very low cadmium content.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The luminescent material may also be an inorganic phosphor. Examples of inorganic phosphor materials include, but are not limited to, cerium (Ce) doped YAG (Y$_3$Al$_5$O$_{12}$) or LuAG (Lu$_3$Al$_{15}$O$_{12}$). Ce doped YAG emits yellowish light, whereas Ce doped LuAG emits yellow-greenish light. Examples of other inorganic phosphors materials which emit red light may include, but are not limited to ECAS and BSSN; ECAS being Ca$_{1-x}$AlSiN$_3$:Eu$_x$ wherein $0<x\leq 1$, preferably $0<x\leq 0.2$; and BSSN being Ba$_{2-x-z}$M$_x$Si$_{5-y}$Al$_y$N$_{8-y}$O$_y$:Eu$_z$ wherein M represents Sr or Ca, $0\leq x\leq 1$, $0\leq y\leq 4$, and $0.0005\leq z\leq 0.05$, and preferably $0\leq x\leq 0.2$.

In embodiments of the invention as set forth below, the luminescent material is made of material selected from the group comprising (M<I>$_{(1-x-y)}$M<II>$_x$ M<III>$_y$)$_3$ (M<IV>$_{(1-z)}$ M<V>$_z$)$_5$O$_{12}$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0<x\leq 1$, $0<y\leq 0.1$, $0<z<1$, (M<I>$_{(1-x-y)}$M<II>$_x$ M<III>$_y$)$_2$O$_3$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0<x\leq 1$, $0<y\leq 0.1$, (M<I>$_{(1-x-y)}$ M<II>$_x$ M<III>$_y$) S$_{(1-z)}$ Se where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0<x\leq 0.01$, $0\leq y\leq 0.05$, $0\leq z<1$, (M<I>$_{(1-x-y)}$M<II>$_x$ M<III>$_y$)O where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0<x\leq 0.1$, $0<y\leq 0.1$, (M<I>$_{(z-x)}$M<II>$_x$ M<III>$_2$) O$_7$ where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<x\leq 1$, (M<I>$_{(1-x)}$M<II>$_x$ M<III>$_{(1-y)}$ M<IV>$_y$) O$_3$ where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0<x\leq 0.1$, $0<y\leq 0.1$, or mixtures thereof.

Other suitable luminescent materials are Ce doped Yttrium aluminum garnet (YAG, Y$_3$Al$_5$O$_{12}$) and Lutetium-Aluminum-Garnet (LuAG). A luminescent light guide may comprise a central emission wavelength within a blue color-range or within a green color-range or within a red color-range. The blue color-range is defined between 380 nanometer and 495 nanometer, the green color-range is defined between 495 nanometer and 590 nanometer, and the red color-range is defined between 590 nanometer and 800 nanometer.

A selection of phosphors which may be used in embodiments is given in table 1 below along with the maximum emission wavelength.

TABLE 1

| Phosphor | Maximum emission wavelength [nm] |
|---|---|
| CaGa$_2$S$_4$: Ce | 475 |
| SrGa$_2$S$_4$: Ce | 450 |
| BaAl$_2$S$_4$: Eu | 470 |
| CaF$_2$: Eu | 435 |
| Bi$_4$Si$_3$O$_{12}$: Ce | 470 |
| Ca$_3$Sc$_2$Si$_3$O$_{12}$: Ce | 490 |

The light guides as set forth below according to embodiments of the invention may comprise regions with a different density of suitable luminescent material for converting the light to another spectral distribution. In an embodiment a transparent light guide comprises two parts adjacent to each other and only one of which comprises a luminescent material and the other part is transparent or has a relatively low concentration of luminescent material. In another embodiment the light guide comprises yet another, third part, adjacent to the second part, which comprises a different luminescent material or a different concentration of the same luminescent material. The different parts may be integrally formed thus forming one piece or one light guide. In an embodiment a partially reflecting element may be arranged between the different parts of the light guide, for example between the first part and the second part. The partially reflecting element is adapted for transmitting light with one specific wavelength or spectral distribution and for reflecting light with another, different, specific wavelength or spectral distribution. The partially reflecting element may thus be a dichroic element such as a dichroic mirror.

In another embodiment (not shown) a plurality of wavelength converting regions of luminescent material is arranged at the light input surface of a transparent light guide above or on top of a plurality of light sources, such as LEDs. Thus the surface area of each of the plurality of wavelength converting regions correspond to the surface area of each of the plurality of light sources such that light from the light sources is coupled into the transparent light guide via the regions of luminescent material. The converted light is then coupled into the transparent part of the light guide and subsequently guided to the light exit surface of the light guide. The wavelength converting regions may be arranged on the light input surface or they may be formed in the light guide. The wavelength converting regions may form part of a homogeneous layer arranged on or in the light guide at the light input surface. Parts of the homogeneous layer extending between two neighboring wavelength converting regions may be transparent and may additionally or alternatively have the same refractive index as the wavelength converting regions. The different wavelength converting regions may comprise mutually different luminescent materials. The distance between the light sources and the luminescent regions may be below 2 mm, below 1 mm or below 0.5 mm.

In embodiments of the light emitting device according to the invention as set forth below a coupling structure or a coupling medium may be provided for efficiently coupling the light emitted by the light source into the light guide. The coupling structure may be a refractive structure having features, such as e.g. protrusions and recesses forming a wave shaped structure. The typical size of the features of the coupling structure is 5 µm to 500 µm. The shape of the features may be e.g. hemispherical (lenses), prismatic, sinusoidal or random (e.g. sand-blasted). By choosing the appropriate shape, the amount of light coupled into the light guide can be tuned. The refractive structures may be made by mechanical means such as by chiseling, sand blasting or the like. Alternatively, the refractive structures may be made by replication in an appropriate material, such as e.g. polymer or sol-gel material. Alternatively, the coupling structure may be a diffractive structure, where the typical size of the features of the diffractive coupling structure is 0.2 µm to 2 µm. The diffraction angles $\theta_{in}$ inside the light guide are given by the grating equation $\lambda/\Lambda = n_{in} \cdot \sin \theta_{in} - n_{out} \cdot \sin \theta_{out}$, where $\lambda$ is the wavelength of LED light, $\Lambda$ is the grating period, $n_{in}$ and $n_{out}$ are the refractive indices inside and outside the light guide, $\theta_{in}$ and $\theta_{out}$ are the diffraction angle inside and the incident angle outside the light guide, respectively. If we assume the same refractive index $n_{out}=1$ for low-index layer and coupling medium, we find, with the condition for total internal reflection $n_{in} \sin \theta_{in} = n_{out}$, the following condition: $\lambda/\Lambda = 1 - \sin \theta_{out}$, i.e. $\Lambda = \lambda$ for normal incidence $\theta_{out}=0$. Generally, not all other angles $\theta_{out}$ are diffracted into the light guide. This will happen only if its refractive index $n_{in}$ is high enough. From the grating equation it follows that for the condition $n_{in} \geq 2$ all angles are diffracted if $\Lambda = \lambda$. Also other periods and refractive indices may be used, leading to less light that is diffracted into the light guide. Furthermore, in general a lot of light is transmitted ($0^{th}$ order). The amount of diffracted light depends on the shape and height of the grating structures. By choosing the appropriate parameters, the amount of light coupled into the light guide can be tuned. Such diffractive structures most easily are made by replication from structures that have been made by e.g. e-beam lithography or holography. The replication may be done by a method like soft nano-imprint lithography. The coupling medium may e.g. be air or another suitable material.

Turning now to FIG. 1, a 3-dimensional perspective view of a light emitting device 1000 is shown comprising a light guide 4000 adapted for converting incoming light with a first spectral distribution to light with a second, different spectral distribution. The light guide 4000 shown in FIG. 1 comprises or is constructed as a wavelength converter structure 6000 having a first conversion part 6110 in the form of a UV to blue wavelength converter and a second conversion part 6120 in the form of a phosphor adapted to emit white light 1400 based on the blue light input from the first conversion part 6110. Hence, the light emitting device 1000 shown in FIG. 1 comprises a light source in the form of a plurality of LEDs 2100, 2200, 2300 emitting light in the UV to blue wavelength range. The LEDs 2100, 2200, 2300 are arranged on a base or substrate 1500. Particularly, the first conversion part 6110 comprises a polycrystalline cubic Yttrium Aluminum Garnet (YAG), doped with rare earth ions, in an embodiment Europium and/or Terbium, while the second conversion part 6120 comprises a yellow phosphor. This embodiment is advantageous in that the surface area of the light exit surface is smaller than the surface area required to build a light source consisting of direct light emitting LEDs. Thereby, a gain in etendue can be realized.

Alternatives for generating white light with a blue or UV light source include but are not limited to LEDs emitting blue light, which light is converted to green/blue light in the first conversion part 6110, which in turn is converted to white light by the second conversion part being provided as a red phosphor, and LEDs emitting blue light, which light is converted to green light in the first conversion part 6110, which in turn is mixed with red and blue light to generate a white LED source, wherein the mixing is achieved by means of a second conversion part in the form of a red phosphor in front of which a diffusor is arranged.

Figure 2:
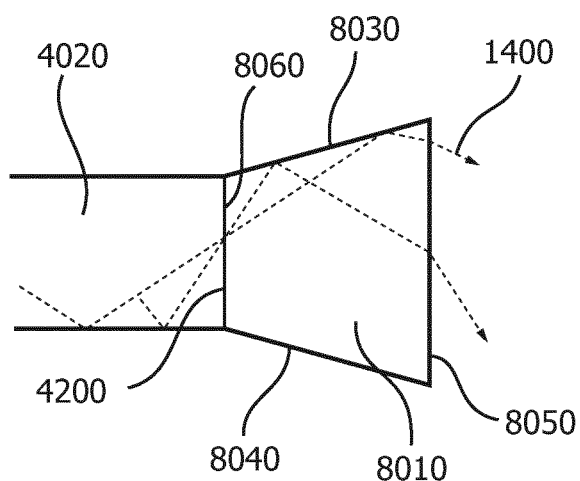
FIG. 2 shows side view of a light guide which is provided with an optical element at an exit surface.

FIG. 2 shows a light guide 4020 which comprises an optical element 8010 arranged with a light input facet 8060 in optical connection with a light exit surface 4200 of the light guide 4020. The optical element 8010 is made of a material having a high refractive index, in an embodiment a refractive index which is equal to or higher than that of the light guide 4020, and comprises a quadrangular cross section and two tapered sides 8030 and 8040. The tapered sides 8030 and 8040 are inclined outwardly from the light exit surface 4200 of the light guide 4020 such that the light exit facet 8050 of the optical element 8010 has a larger surface area than both the light input facet 8060 and the light exit surface 4200 of the light guide 4020. The optical element 8010 may alternatively have more than two, particularly four, tapered sides. In an alternative, the optical element 8010 has a circular cross section and one circumferential tapered side. With such an arrangement light will be reflected at the inclined sides 8030 and 8040 and has a large chance to escape if it hits the light exit facet 8050, as the light exit facet 8050 is large compared to the light input facet 8060. The shape of the sides 8030 and 8040 may also be curved and chosen such that all light escapes through the light exit facet 8050.

The optical element may also be integrally formed from the light guide 4020, for example by shaping a part of the light guide such that a predetermined optical element is formed at one of the ends of the light guide. The optical element may for example have the shape of a collimator, or may have a cross-sectional shape of a trapezoid and in an embodiment outside surfaces of the trapezoid shape are provided with reflective layers. Thereby the received light may be shaped such as to comprise a larger spot size while simultaneously minimizing the loss of light through other surfaces than the light exit surface, thus also improving the intensity of the emitted light. In another embodiment the optical element has the shape of a lens array, for example convex or concave lenses or combinations thereof. Thereby the received light may be shaped such as to form focused light, defocused light or a combination thereof. In case of an array of lenses it is furthermore feasible that the emitted light may comprise two or more separate beams each formed by one or more lenses of the array. In more general terms, the light guide may thus have differently shaped parts with different sizes. Thereby a light guide is provided with which light may be shaped in that any one or more of the direction of emission of light from the light exit surface, the beam size and beam shape of the light emitted from the light exit surface may be tuned in a particularly simple manner, e.g. by altering the size and/or shape of the light exit surface. Thus, a part of the light guide functions as an optical element.

The optical element may also be a light concentrating element (not shown) arranged at the light exit surface of the light guide. The light concentrating element comprises a quadrangular cross section and two outwardly curved sides such that the light exit surface of the light concentrating element has a larger surface area than the light exit surface of the light guide. The light concentrating element may alternatively have more than two, particularly four, tapered sides. The light concentrating element may be a compound parabolic light concentrating element (CPC) having parabolic curved sides. In an alternative, the light concentrating element has a circular cross section and one circumferential tapered side. If, in an alternative, the refractive index of the light concentrating element is chosen to be lower than that of the light guide (but higher than that of air), still an appreciable amount of light can be extracted. This allows for a light concentrating element which is easy and cheap to manufacture compared to one made of a material with a high refractive index. For example, if the light guide has a refractive index of n=1.8 and the light concentrating element has a refractive index of n=1.5 (glass), a gain of a factor of 2 in light output may be achieved. For a light concentrating element with a refractive index of n=1.8, the gain would be about 10% more. Actually, not all light will be extracted since there will be Fresnel reflections at the interface between the optical element or the light concentrating element and the external medium, generally being air. These Fresnel reflections may be reduced by using an appropriate anti-reflection coating, i.e. a quarter-lambda dielectric stack or moth-eye structure. In case the light output as function of position over the light exit facet is inhomogeneous, the coverage with anti-reflection coating might be varied, e.g. by varying the thickness of the coating.

One of the interesting features of a CPC is that the etendue (=$n^2 \times area \times solid\ angle$, where n is the refractive index) of the light is conserved. The shape and size of the light input facet of the CPC can be adapted to those of the light exit surface of the light guide and/or vice versa. A large advantage of a CPC is that the incoming light distribution is transformed into a light distribution that fits optimally to the acceptable etendue of a given application. The shape of the light exit facet of the CPC may be e.g. rectangular or circular, depending on the desires. For example, for a digital projector there will be requirements to the size (height and width) of the beam, as well as for the divergence. The corresponding etendue will be conserved in a CPC. In this case it will be beneficial to use a CPC with rectangular light input and exit facets having the desired height/width ratio of the display panel used. For a spot light application, the requirements are less severe. The light exit facet of the CPC may be circular, but may also have another shape (e.g. rectangular) to illuminate a particularly shaped area or a desired pattern to project such pattern on screens, walls, buildings, infrastructures etc. Although CPCs offer a lot of flexibility in design, their length can be rather large. In general, it is possible to design shorter optical elements with the same performance. To this end, the surface shape and/or the exit surface may be adapted, e.g. to have a more curved exit surface such as to concentrate the light. One additional advantage is that the CPC can be used to overcome possible aspect ratio mismatches when the size of the light guide is restrained by the dimensions of the LED and the size of the light exit facet is determined by the subsequent optical components. Furthermore, it is possible to place a mirror (not shown) partially covering the light exit facet of the CPC, e.g. using a mirror which has a 'hole' near or in its center. In this way the exit plane of the CPC is narrowed down, part of the light is being reflected back into the CPC and the light guide, and thus the exit etendue of the light would be reduced. This would, naturally, decrease the amount of light that is extracted from the CPC and light guide. However, if this mirror has a high reflectivity, like e.g. Alanod 4200AG, the light can be effectively injected back into the CPC and light guide, where it may be recycled by TIR. This will not change the angular distribution of the light, but it will alter the position at which the light will hit the CPC exit plane after recycling thus increasing the luminous flux. In this way, part of the light, that normally would be sacrificed in order to reduce the system etendue, can be re-gained and used to increase for example the homogeneity. This is of major importance if the system is used in a digital projection application. By choosing the mirror in the different ways, the same set of CPC and light guide can be used to address systems using different panel sizes and aspect ratio's, without having to sacrifice a large amount of light. In this way, one single system can be used for various digital projection applications.

By using any one of the above structures described with reference to FIG. 2, problems in connection with extracting light from the high-index light guide material to a low-index material like air, particularly related to the efficiency of the extraction, are solved.

Figure 3:
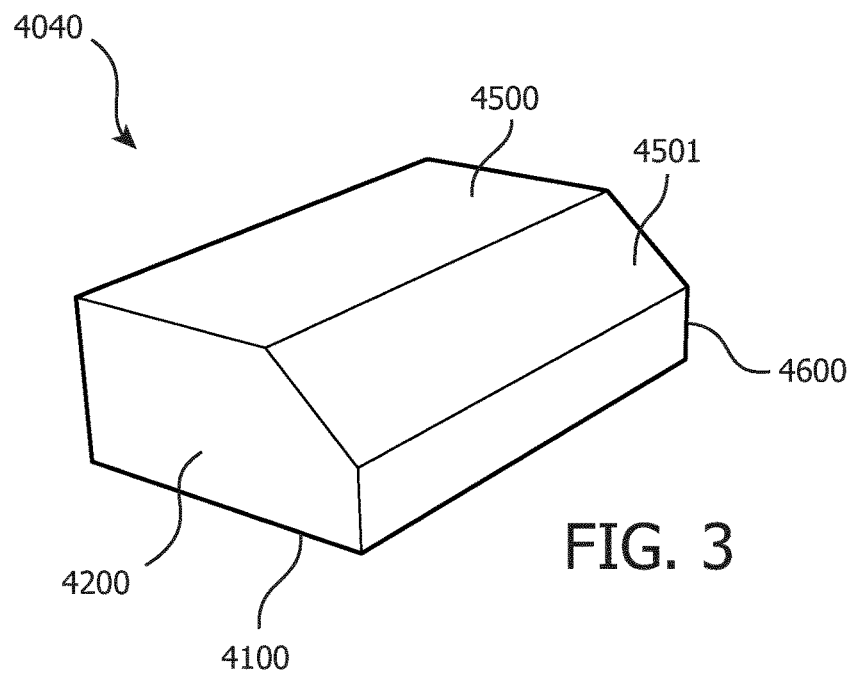
FIG. 3 shows a perspective view of a light guide which is shaped throughout its length such as to provide a shaped light exit surface.
Figure 4:
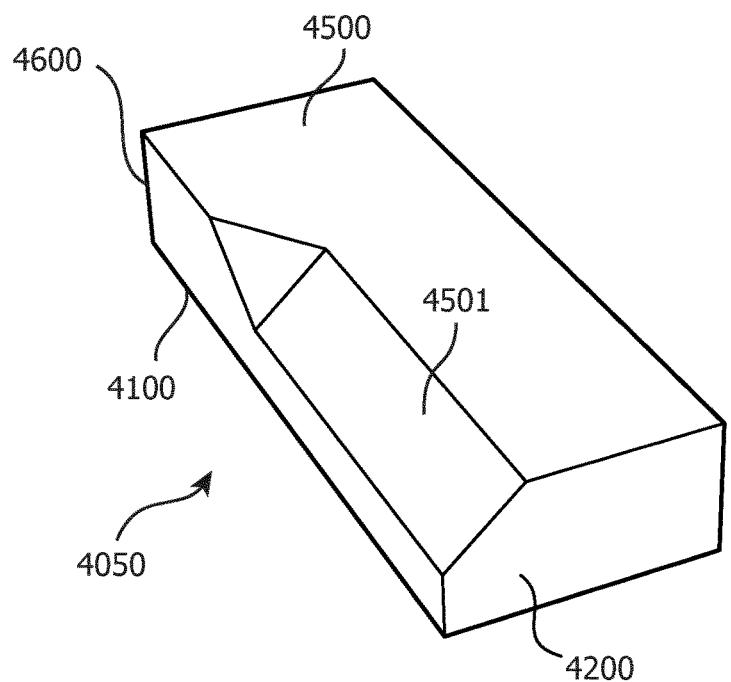
FIG. 4 shows a side view of a light guide which is shaped over a part of its length such as to provide a shaped light exit surface.

With reference to FIGS. 3 and 4 different possibilities for providing a light distribution having a particular shape will be described. FIG. 3 shows a perspective view of a light guide 4040 which is shaped throughout its length in order to provide a shaped light exit surface 4200. The light guide 4040 may be a transparent light guide or a light guide adapted for converting light with a first spectral distribution to light with a second spectral distribution. A part 4501 of the light guide 4040 extending throughout the length of the light guide 4040, particularly adjacent to the surface 4500 and opposite to the light input surface 4100, has been removed such as to provide the light guide 4040 with a shape corresponding to the desired shape of the light distribution at the light exit surface 4200, the shape extending throughout the entire length of the light guide 4040 from the light exit surface 4200 to the opposite surface 4600.

FIG. 4 shows a side view of a light guide 4050 which is shaped over a part of its length such as to provide a shaped light exit surface 4200. The light guide 4050 may be a transparent light guide or a light guide adapted for converting light with a first spectral distribution to light with a second spectral distribution. A part 4501 of the light guide 4050 extending over a part of the length of the light guide 4050 has been removed, particularly adjacent to the surface 4500 and opposite to the light input surface 4100, such as to provide the light guide 4050 with a shape corresponding to the desired shape of the light distribution at the light exit surface 4200, the shape extending over a part of the length of the light guide 4050 adjacent the light exit surface 4200.

Another part or more than one part of the light guide may be removed such as to provide for other shapes of the light exit surface. Any feasible shape of the light exit surface may be obtained in this way. Also, the light guide may be divided partly or fully into several parts having different shapes, such that more complex shapes may be obtained. The part or parts removed from the light guide may be removed by means of e.g. sawing, cutting or the like followed by polishing of the surface that is exposed after the removal of the part or parts. In another alternative a central part of the light guide may be removed, e.g. by drilling, such as to provide a hole in the light exit surface.

In an alternative embodiment, a light distribution having a particular shape may also be obtained by surface treating, e.g. roughening, a part of the light exit surface of the light guide, whilst leaving the remaining part of the light exit surface smooth. In this embodiment no parts of the light guide need to be removed. Likewise any combination of the above possibilities for obtaining a light distribution having a particular shape is feasible.

Figure 5:
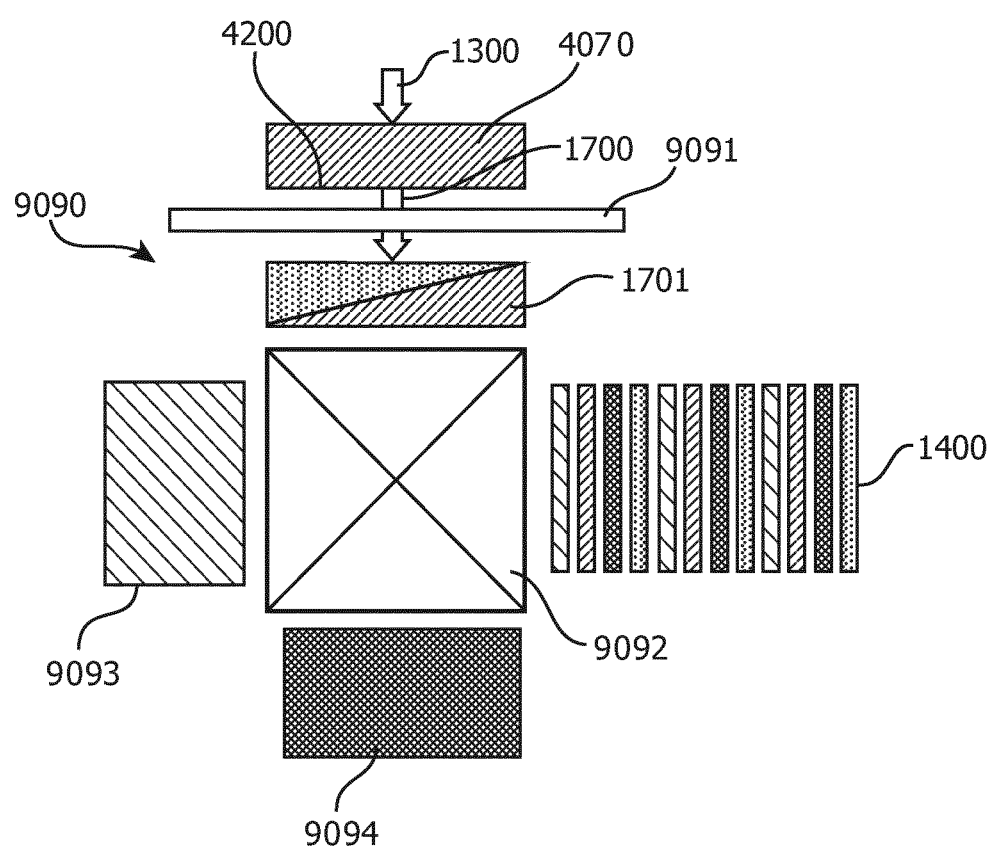
FIG. 5 shows a side view of a lighting system with a light guide and additional light sources and which is provided with a filter and a dichroic optical element.

FIG. 5 shows a side view of a lighting system, e.g. a digital projector, with a light guide 4070 which is adapted for converting incident light 1300 in such a way that the emitted light 1700 is in the yellow and/or orange wavelength range, i.e. roughly in the wavelength range of 560 nm to 600 nm. The light guide 4070 may e.g. be provided as a transparent garnet made of ceramic materials such as Ce-doped $(Lu,Gd)_3Al_5O_{12}$, $(Y,Gd)_3Al_5O_{12}$ or $(Y,Tb)_3Al_5O_{12}$. With higher Ce-content and/or higher substitution levels of e.g. Gd and/or Tb in favor of Ce, the spectral distribution of the light emitted by the light guide can be shifted to higher wavelengths. In an embodiment, the light guide 4070 is fully transparent.

At the light exit surface 4200 an optical element 9090 is provided. The optical element 9090 comprises a filter 9091 for filtering the light 1700 emitted from the light guide 4070 such as to provide filtered light 1701, at least one further light source 9093, 9094 and an optical component 9092 adapted for combining the filtered light 1701 and the light from the at least one further light source 9093, 9094 such as to provide a common light output 1400. The filter 9091 may be an absorption filter or a reflective filter, which may be fixed or switchable. A switchable filter may e.g. be obtained by providing a reflective dichroic mirror, which may be low-pass, band-pass or high-pass according to the desired light output, and a switchable mirror and placing the switchable mirror upstream of the dichroic mirror seen in the light propagation direction. Furthermore, it is also feasible to combine two or more filters and/or mirrors to select a desired light output. The filter 9091 is a switchable filter enabling the transmission of unfiltered yellow and/or orange light or filtered light, particularly and in the embodiment shown filtered red light, according to the switching state of the filter 9091. The spectral distribution of the filtered light depends on the characteristics of the filter 9091 employed. The optical component 9092 as shown may be a cross dichroic prism also known as an X-cube or it may in an alternative be a suitable set of individual dichroic filters.

In the embodiment shown two further light sources 9093 and 9094 are provided, the further light source 9093 being a blue light source and the further light source 9094 being a green light source. Other colors and/or a higher number of further light sources may be feasible too. One or more of the further light sources may also be light guides according to embodiments of the invention as set forth below. A further option is to use the light filtered out by the filter 9091 as a further light source. The common light output 1400 is thus a combination of light 1701 emitted by the light guide 4070 and filtered by the filter 9091 and light emitted by the respective two further light sources 9093 and 9094. The common light output 1400 may advantageously be white light.

The solution shown in FIG. 5 is advantageous in that it is scalable, cost effective and easily adaptable according to the requirements for a given application of a light emitting device according to embodiments of the invention.

Figure 6A:
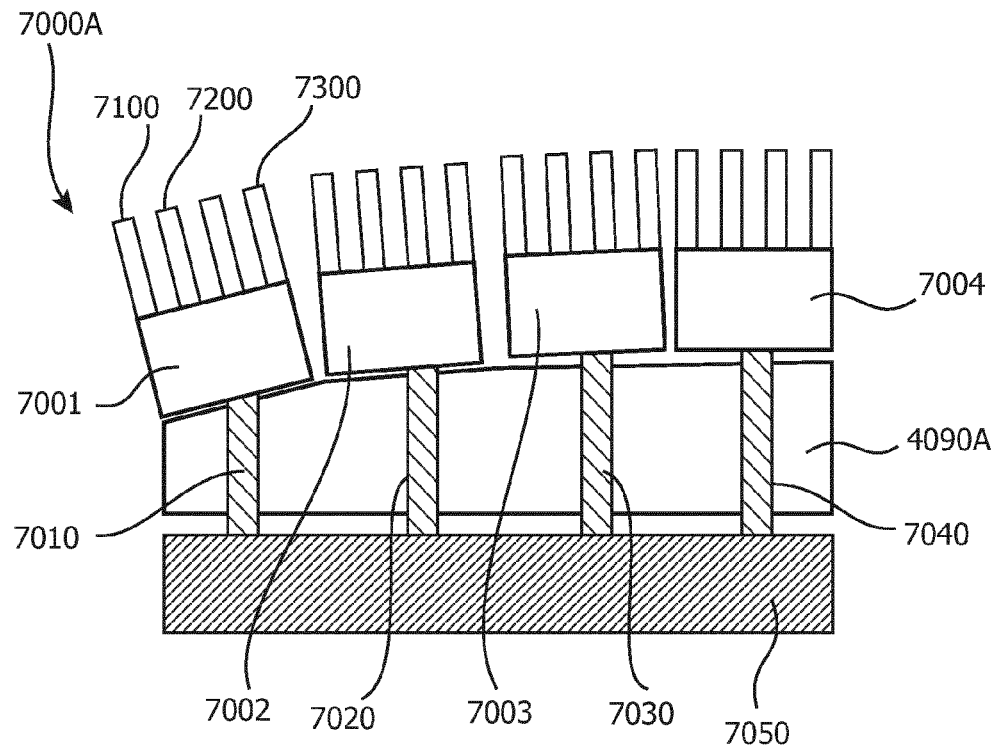
FIGS. 6A and 6B show light guides provided with a heat sink element arranged adjacent a surface of the light guide.
Figure 6B:
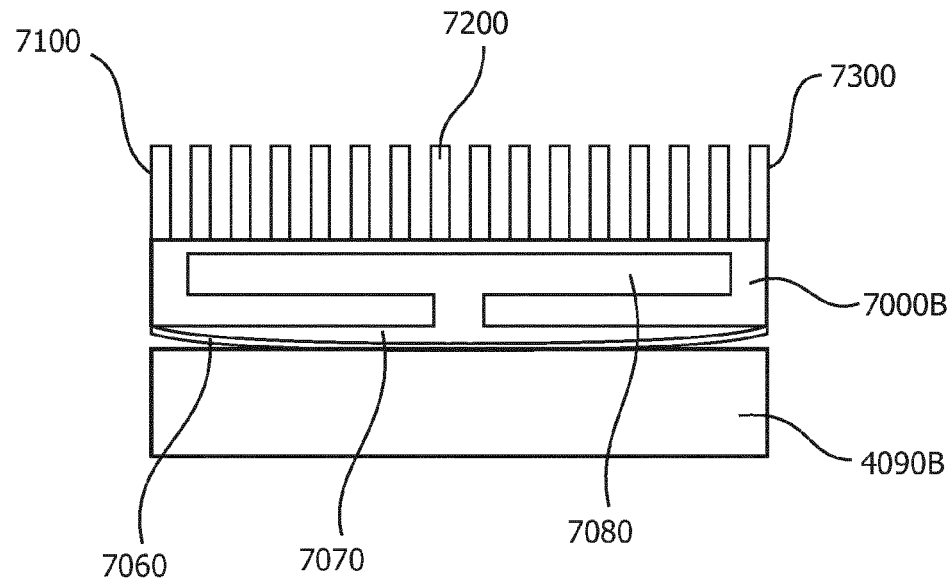

FIGS. 6A and 6B show a side view of a light guide 4090A and a light guide 4090B, respectively, that comprise a heat sink element 7000A, 7000B, respectively, arranged on one of the surfaces of the light guide 4090A, 4090B, respectively, different from the light input surface, preferably at a distance of about 30 µm or less therefrom. Irrespective of the embodiment the respective heat sink element 7000A, 7000B comprises fins 7100, 7200, 7300 for improved heat dissipation, the fins, however, being optional elements. Irrespective of the embodiment the respective heat sink element 7000A, 7000B is adapted to be conformable to the surface shape of the light guide, and is thus adapted for providing a conformal thermal contact over the whole contact area with the light guide. Thereby an increased thermal contact area and thus an improved cooling of the light guide is obtained and the existing tolerance limits on the positioning of the heat sink element become less critical.

FIG. 6A shows that heat sink element 7000A comprises a plurality of heat sink parts, here four heat sink parts 7001, 7002, 7003 and 7004, one or more of which, here all four, may be provided with fins. Obviously, the more heat sink parts the heat sink element 7000A comprises, the more precisely the heat sink element 7000 may be conformed to the surface of the light guide. Each heat sink part 7001, 7002, 7003, 7004 is adapted for providing a conformal thermal contact over the whole contact area with the light guide. The heat sink parts may be arranged in mutually different distances from the surface of the light guide. Furthermore, the heat sink element 7000A comprises a common carrier 7050 to which the heat sink parts 7001, 7002, 7003 and 7004 are attached individually by means of attachment elements 7010, 7020, 7030 and 7040, respectively. Alternatively each heat sink part may be assigned its own carrier. It is noted that these elements are optional.

FIG. 6B shows that heat sink element 7000B comprises a bottom part 7060 adapted to be conformable to the shape of the surface of the light guide 4090B at which it is to be arranged. The bottom part 7060 is flexible and may e.g. be a thermally conductive metal layer such as a copper layer. The heat sink element 7000B further comprises a thermally conductive layer 7070 arranged between the bottom element 7060 and the remainder of the heat sink element 7000B for improved flexibility and conformability of the heat sink element 7000B. The thermally conductive layer 7070 may e.g. be a thermally conductive fluid or paste. The thermally conductive layer 7070 is in an embodiment highly reflective and/or comprises a highly reflective coating. The heat sink element 7000B further comprises a fluid reservoir 7080 arranged inside the heat sink element 7000B for generating a fluid flow for improved heat dissipation. In an alternative, the fluid reservoir 7080 may also be arranged externally on the heat sink element 7000B, e.g. extending along a part of or the whole external periphery of the heat sink element 7000B. The fluid flow may be enhanced by means of a pump. It is noted that the conductive layer 7070 and the fluid reservoir 7080 are optional elements.

Irrespective of the embodiment, the heat sink element 7000A, 7000B may be made of a material selected from copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Furthermore, a heat sink element combining features of the embodiments described above is feasible. Also, it is feasible to arrange a heat sink element according to any of the above embodiments at more than one surface of the light guide 4090A or 4090B.

Finally it is noted that the provision of a heat sink element as described above is especially advantageous in a light emitting device employing a light source emitting in the red wavelength range and/or being adapted for emitting light in the infrared wavelength range, e.g. by comprising an IR emitting phosphor.

FIGS. 7A to 7D show side views of a light guide 4010A, 4010B, 4010C and 4010D, respectively, comprising a light polarizing element 9001 arranged adjacent to the light exit surface 4200 of the respective light guide 4010A, 4010B, 4010C, 4010D as well as a reflective element 7400 arranged at a surface 4600 of the respective light guide 4010A, 4010B, 4010C, 4010D extending opposite to the light exit surface 4200. Thereby a polarized light source having a high brightness and a high efficiency may be obtained. Irrespective of the embodiment the polarizing element 9001 may be any one of a reflective linear polarizer and a reflective circular polarizer. Wire grid polarizers, reflective polarizers based on stack of polymer layers comprising birefringent layers are examples of reflective linear polarizers. Circular polarizers can be obtained using polymers in the so-called cholesteric liquid crystal phase to make so-called cholesteric polarizers transmitting only light of one polarization and of a specific spectral distribution. Alternatively or in addition to the reflective polarizers, polarizing beam splitters can also be employed. Furthermore scattering polarizers can also be used. In another embodiment, polarization by reflection may be used, e.g. by means of a polarizing element in the form of a wedge made of a material like glass, in which light is incident close to the Brewster angle. In yet another embodiment, the polarizing element 9001 may be a so-called polarized backlight such as described in WO 2007/036877 A2. In yet another embodiment, the polarizing element 9001 may be a polarizing structure.

FIG. 9A shows an embodiment in which the polarizing element 9001 is arranged on the light exit surface 4200 of the light guide 4010A. The light sources 2100, 2200, 2300 emit first light 1300 having a first spectral distribution, which is converted in the light guide 4010A into second light 1400 having a second spectral distribution. Due to the polarizing element 9001 only light of a first polarization, in this case p-polarized light 1400PA, is transmitted and emitted from the light exit surface 4200 and light of a second polarization, in this case s-polarized light 1400S, is reflected back into the light guide 4010A. The reflected s-polarized light 1400S is reflected by the reflective element 7400. When reflected, at least a part of the reflected s-polarized light 1400S is altered into p-polarized light 1400PB which is transmitted by the polarizing element 9001. Thus, a light output comprising only light with a first polarization, in this case p-polarized light 1400PA, 1400PB is obtained.

Furthermore, in this example the light guide 4010A comprises a ¼ lambda plate 9002 arranged at one of the surfaces extending between the light exit surface 4200 and the surface 4600, in the embodiment shown partially covering the surface 4500. Alternatively, the ¼ lambda plate may cover the surface 4500 completely or it may comprise two or more separate segments. Alternatively or in addition thereto, further ¼ lambda plates may be arranged at one or more other of the surfaces extending between the light exit surface 4200 and the opposite surface 4600. In yet another embodiment the ¼ lambda plate 9002 may be arranged between the light guide and the reflective element 7400 such that a gap is provided between the ¼ lambda plate and the light guide. The ¼ lambda plate 9002 may be used for converting light with a first polarization into light with a second polarization, particularly for converting circularly polarized light into linearly polarized light. It is noted, however, that irrespective of the embodiment the ¼ lambda plate 9002 is an optional element, and that it thus may also be omitted, for example in the embodiments according to the invention as set forth below.

Figure 7A:
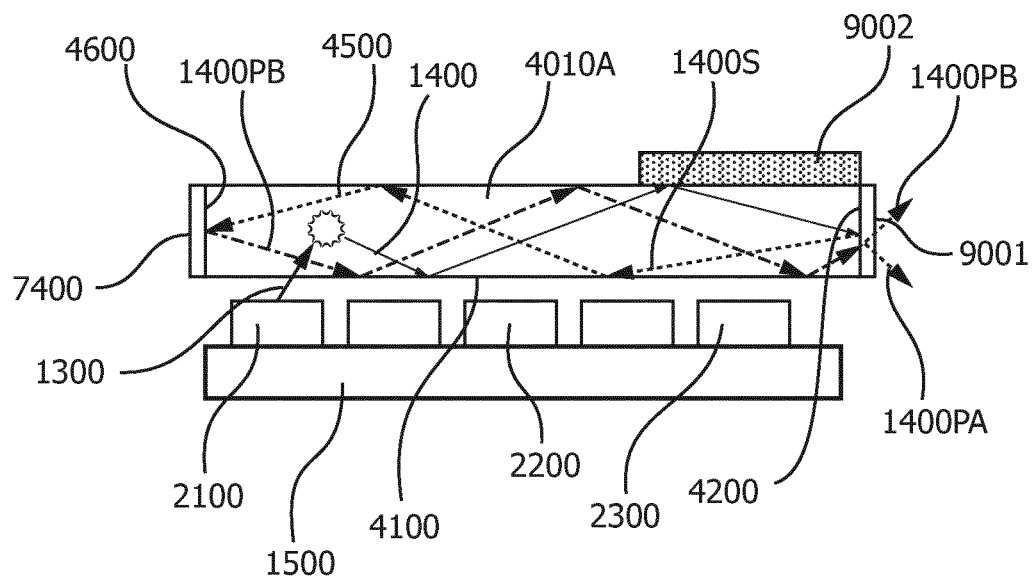
FIG. 7A to 7D show light guides provided with a polarizing element arranged adjacent to the light exit surface of the light guide.
Figure 7B:
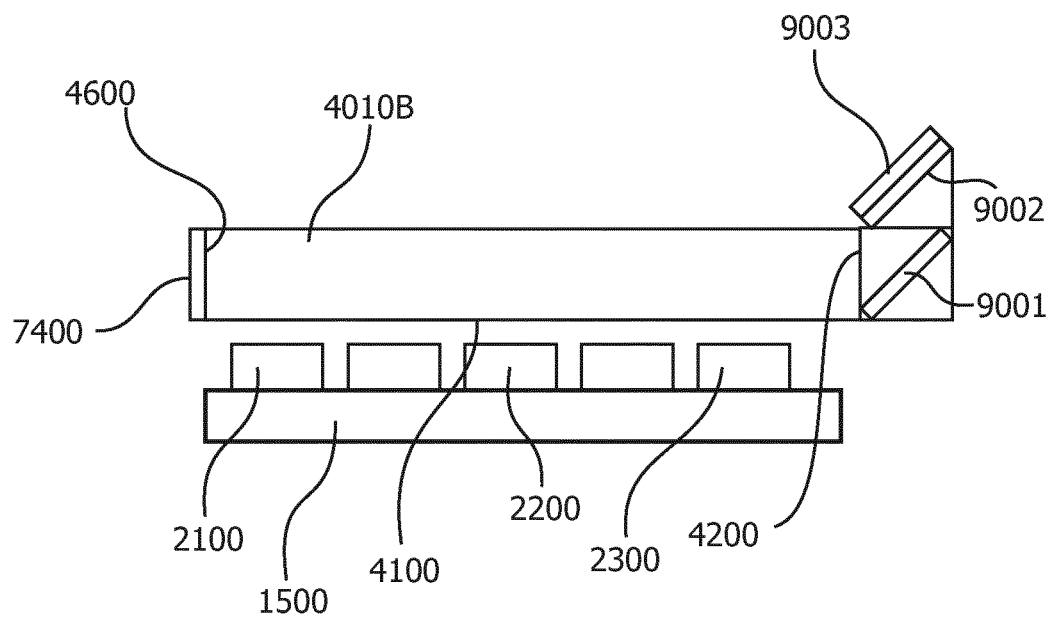

FIG. 7B shows an embodiment in which the polarizing element 9001 is arranged angled with respect to the light exit surface 4200, as shown in an angle of 45° relative to the light exit surface 4200 although any angle is in principle feasible. Furthermore, a ¼ lambda plate 9002 and a reflective element 9003 stacked on top of each other are arranged in the beam path downstream of the polarizing element 9001 such that they extend substantially in parallel with the polarizing element 9001. Thereby, reflected light with a first polarization is coupled out of the light guide 4010B and is thereupon altered into light with a second polarization by the polarizing element 9001, Subsequently the light with the second polarization is redirected by the reflective element 9003 and further polarized by the ¼ lambda plate 9002.

Figure 7C:
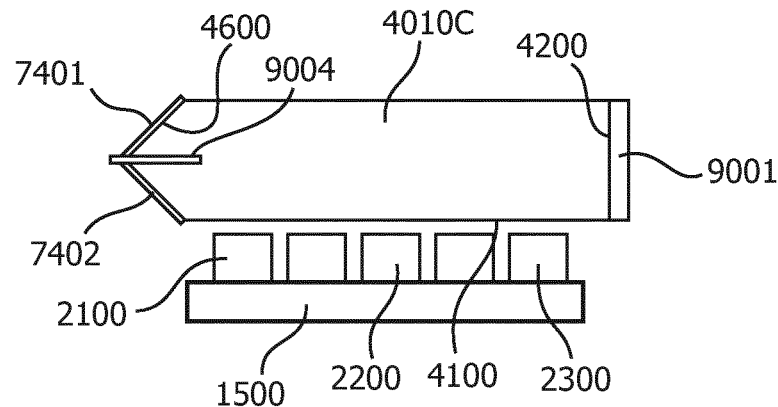

FIG. 7C shows an embodiment very similar to that shown in FIG. 9A but according to which the light guide 4010C as an alternative comprises a tapered surface 4600 opposite to the light exit surface 4200. The tapered surface 4600 is provided with reflective elements 4701, 4702 separated by an insert in the form of a ½ lambda plate 9004.

Figure 7D:
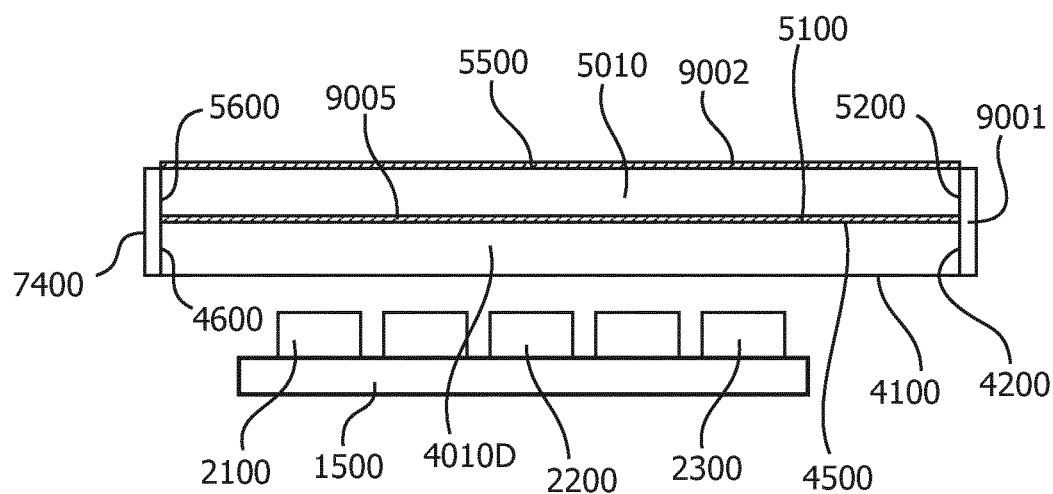

FIG. 7D shows an embodiment in which two light guides 4010D and 5010 are stacked such that the surface 4500 of the light guide 4010D and the light input surface 5100 of the light guide 5010 face each other and with a further polarizing element 9005 arranged in between and in optical contact with the light guides 4010D and 5010. A polarizing element 9001 is arranged on the light exit surfaces 4200 and 5200 of the light guides 4010D and 5010 and a reflective element 7400 is arranged on the surfaces 4600 and 5600 of the light guides 4010D and 5010 opposite the respective light exit surfaces 4200, 5200. The further polarizing element 9005 transmits light with a polarization being perpendicular to the polarization of the light transmitted by the polarizing element 9001. A ¼ lambda plate 9002 may be applied to at least a part of the surface 5500 of the light guide 5010.

In further alternative embodiments the polarizing element 9001 may be provided as a part of an optical element arranged at the light exit surface 4200 of the light guide. In one particular embodiment the polarizing element 9001 is then arranged such as to be located opposite to the light exit surface 4200 in the mounted position of the optical element. By way of example such an optical element may for instance be an optical element, a compound parabolic light concentrating element (CPC) or an optical element as described above. Alternatively, such an optical element may be a light mixing chamber. Particularly in case of a CPC a ¼ lambda plate may be arranged in the CPC opposite to the polarizing element 9001.

Figure 8:
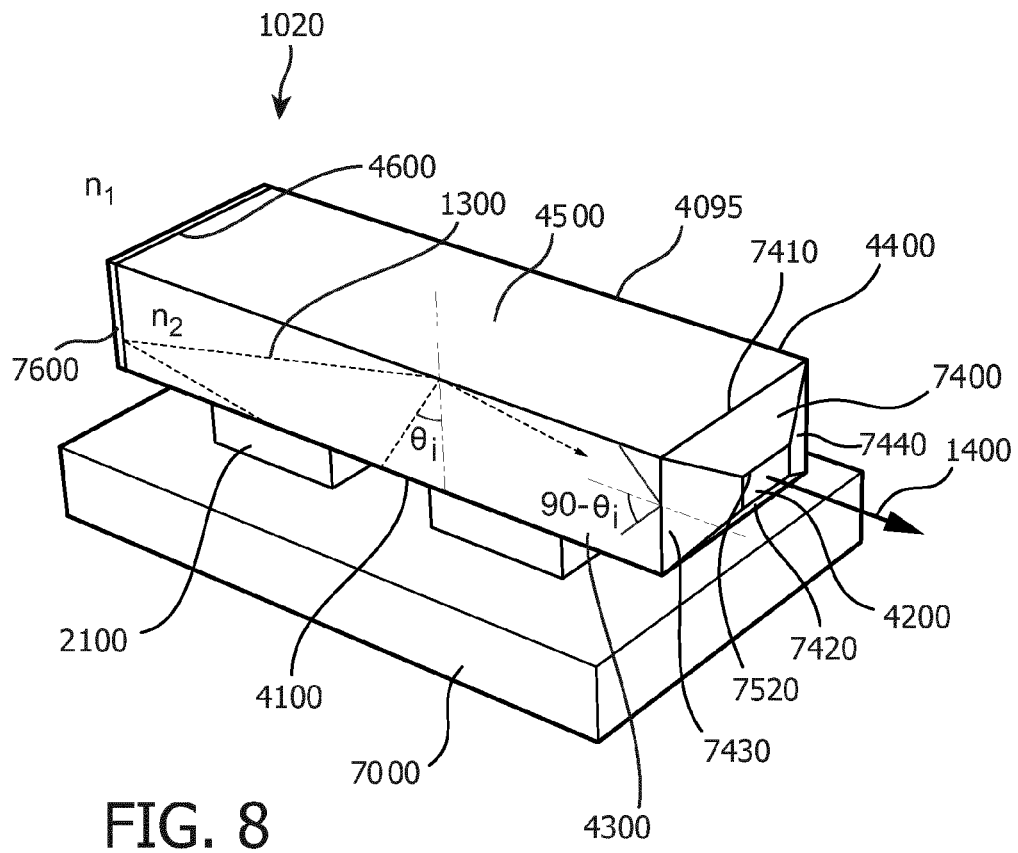
FIG. 8 shows a perspective view of a light emitting device having a tapered exit surface.

FIG. 8 shows a light emitting device 1020 comprising a light source 2100 comprising a plurality of LEDs and a light guide 4095. The light source 2100 is in this example arranged on a base or substrate in the form of a heat sink 7000, preferably made of a metal such as copper, iron or aluminum. It is noted that in other embodiments the base or substrate need not be a heat sink. The light guide 4095 is shown shaped generally as a bar or rod having a light input surface 4100 and a light exit surface 4200 extending in an angle different from zero, in this particular case perpendicular, with respect to one another such that the light exit surface 4200 is an end surface of the light guide 4095. The light input surface 4100 and the light exit surface 4200 may have different sizes, preferably such that the light input surface 4100 is larger than the light exit surface 4200. The light guide 4095 further comprises a further surface 4600 extending parallel to and opposite the light exit surface 4200, the further surface 4600 thus likewise being an end surface of the light guide 4095. The light guide 4095 further comprises side surfaces 4300, 4400, 4500. The light guide 4095 may also be plate shaped, e.g. as a square or rectangular plate.

The light emitting device 1020 further comprises a first mirror element 7600 arranged at the further surface 4600 of the light guide 4095 as well as a second mirror element 7400 arranged at the light exit surface 4200 of the light guide 4095. As shown the first mirror element 7600 is arranged in optical contact with the light exit surface 4200 and the second mirror element 7600 is arranged in optical contact with the further surface 4600. Alternatively, a gap may be provided between one or both of the first and the second mirror element 7600 and 7400 and the further surface 4600 and the light exit surface 4200, respectively. Such a gap may be filled with e.g. air or an optical adhesive.

The light exit surface 4200 of the light guide 4095 is further provided with four inwardly tapered walls and a central flat part extending parallel with the further surface 4600. By "tapered wall" as used herein is meant a wall segment of the light exit surface 4200 which is arranged in an angle different from zero degrees to both the remaining part(s) of the light exit surface and to the surfaces of the light guide extending adjacent to the light exit surface. The walls are tapered inwardly, meaning that the cross-section of the light guide is gradually decreasing towards the exit surface. In this embodiment a second mirror element 7400 is arranged at, and is in optical contact with, the tapered walls of the light exit surface 4200. Hence, the second mirror element is provided with four segments 7410, 7420, 7430 and 7410 corresponding to and covering each of the tapered walls of the light exit surface 4200. A through opening 7520 corresponding to the central flat part of the light exit surface 4200 defines a transparent part of the light exit surface 4200 through which light may exit to be emitted from the light emitting device 1020.

In this way a light emitting device is provided in which the light rays that hit the second mirror element change angular direction such that more light rays are directed towards the light exit surface 4200 and light rays that previously would remain within the light guide 4095 due to TIR due to the change in angular directions now hit the light exit surface 4200 with angles smaller than the critical angle of reflection and consequently may leave the light guide through the through opening 7520 of the light exit surface 4200. Thereby the intensity of the light emitted by the light emitting device through the light exit surface 4200 of the light guide 4095 is increased further. Particularly, when the light guide is a rectangular bar, there will be light rays that hit the second mirror element at the exit surface perpendicularly, and as such cannot leave the bar since they remain bouncing between the two mirror elements. When one mirror element is tilted inwards, the light rays change direction after being reflected at that mirror element and may leave the light guide via the transparent part of the second mirror element. Thus, this configuration provides for improved guidance of light towards the central flat part of the light exit surface 4200 and thus the through hole 7520 in the second mirror element 7400 by means of reflection off of the tapered walls.

In alternative embodiments other numbers of tapered walls, such as less or more than four, e.g. one, two, three, five or six tapered walls, may be provided, and similarly not all tapered walls need be provided with a second mirror element or segments thereof. In other alternatives, one or more of the tapered walls may be uncovered by the second mirror element 7400, and/or the central flat part may be covered partly or fully by the second mirror element 7400.

Figure 9:
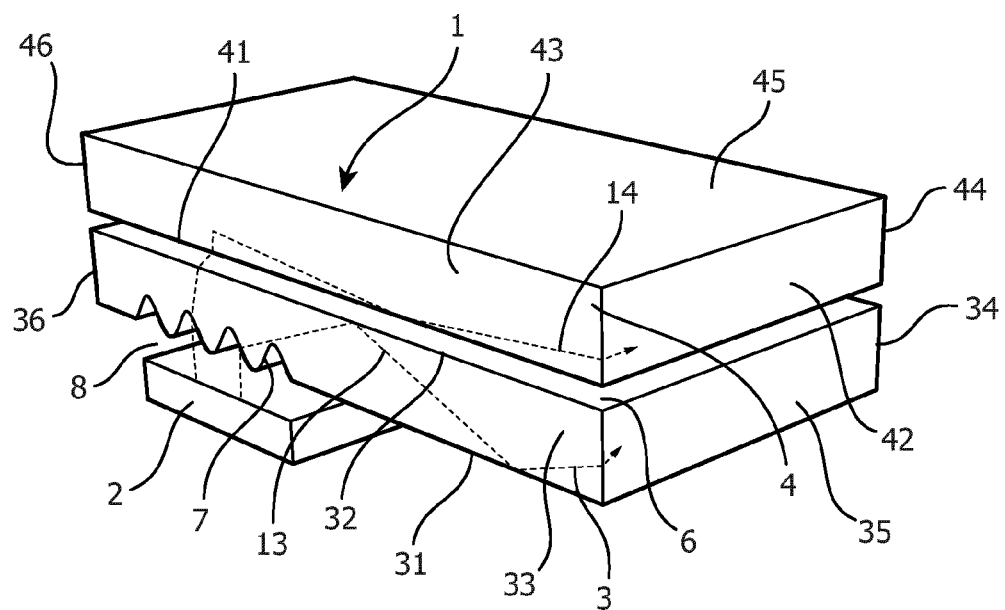
FIG. 9 shows a perspective view of a light emitting device according to a first embodiment of the invention.

Turning now to FIG. 9, a first embodiment of a light emitting device 1 according to the invention is shown.

In the following and with reference to FIG. 9, the features common to all embodiments of a light emitting device 1 according to the invention will be described.

The light emitting device 1 comprises a light source 2, a first light guide 3 and a second light guide 4.

The light source 2 is adapted for, in operation, emitting light 13 with a first spectral distribution. Examples of types of light sources are described above.

The first light guide 3 is shown shaped generally as a bar or rod having a first light input surface 31 and a first light exit surface 32 arranged opposite to one another as well as further side surfaces 33, 34, 35, 36 arranged pairwise opposite one another and extending between the first light input surface 31 and the first light exit surface 32. The first light guide 3 may also be plate shaped, e.g. as a square or rectangular plate as described above.

The first light guide 3 is adapted for or configured to receive the light 13 from the light source 2 at the first light input surface 31, guide the light 13 to the first light exit surface 32 and couple the light 13 out of the first light exit surface 32 and into the second light guide 4.

The first light guide 3 shown in FIG. 9 is a transparent light guide. In embodiments the transparent first light guide 3 has a relatively high refractive index, meaning a refractive index which is higher than e.g. 1.5, or particularly that is higher than that of an optional layer 6 to be described below and possibly also higher than that of the second light guide 4. In embodiments the transparent first light guide 3 also has good heat conductivity properties. Suitable transparent materials are described above.

Generally, but particularly in case of a transparent first light guide 3, the light source 2 is in an embodiment arranged on the first light guide 3 which in this case thus acts as a substrate. The light source may be a solid state light source such as a LED that is directly manufactured on the transparent substrate in any feasible manner known in the art, such as by a chemical or physical deposition method or by Liquid Phase Epitaxy (LPE), the manufacture or growing of the solid state light source being carried out directly onto the transparent light guide or substrate 3. The solid state light source is arranged in direct physical and optical contact with the transparent substrate acting in this embodiment as the first light guide 3 preferably by being provided, e.g. the active layers of the solid state light emitting device are grown, directly onto the transparent substrate and is processed, e.g. etched, directly on the transparent substrate. In other words, the transparent substrate is the substrate on which the solid state light source, i.e. the active layers of the solid state light source, are manufactured. Suitable manufacturing techniques are applied to provide a separation, or gap, between neighboring or adjacent solid state light emitting devices. A particularly preferred material for the transparent substrate is doped or undoped sapphire. The transparent substrate may alternatively be made of a doped or undoped garnet, suitable garnets being described above. Furthermore, the transparent substrate may be luminescent, light concentrating or a combination thereof, suitable materials being described above. As will be described further below, the light source 2 may furthermore be arranged on a base 15.

The second light guide 4 is likewise shown shaped generally as a bar or rod having a second light input surface 41, a second light exit surface 42 being an end surface of the second light guide 4 and extending perpendicular to the second light input surface 41 as well as further side surfaces 43, 44, 45, 46. The second light guide 4 may also be plate shaped, e.g. as a square or rectangular plate as described above.

The second light guide 4 comprises a second light input surface 41 and a second light exit surface 42. The second light guide 4 is adapted for or configured to receive the light 13 at the second light input surface 41 which is coupled out of the first light guide 3, converting the light 13 to light 14 with a second spectral distribution, guide the light 13 and the converted light 14 to the second light exit surface 42 and couple the light 13 and the converted light 14 out of the second light exit surface 42.

In an embodiment, the second light guide 3 is a luminescent light guide made of a luminescent material. Suitable luminescent materials include organic phosphors, organic phosphor dyes and quantum dots which are highly suitable for the purpose of the present invention. Examples and further suitable luminescent materials are described above.

In an embodiment, all light 13 with a first spectral distribution coupled into the second light guide 4 is converted to light 14 with a second spectral distribution. Alternatively, some of the light 13 with the first spectral distribution may be left unconverted and coupled out of the second light guide 4 through the second light exit surface 42.

In an embodiment and as shown in FIG. 9, a part of the light 13 with the first spectral distribution, which due to the angle of incidence with the first light exit surface 32 is not emitted there through, is emitted through an end surface 35 of the first light guide 3, the end surface 35 extending between and perpendicular to the first light input surface 31 and the first light exit surface 32 and furthermore, as shown in FIG. 9, extending parallel to the second light exit surface 42 of the second light guide 4. Thereby the light emitting device according to the invention may emit light comprising a combination of different spectral distributions, i.e. in the embodiment shown in FIG. 9 a combination of the light 13 with the first spectral distribution and the converted light 14 with the second spectral distribution.

The remaining surfaces 33, 34 and 36 of the first light guide 3 may be provided with a reflective material such as a metallic coating or a mirror, such as to ensure that no light is emitted through these surfaces. In an alternative embodiment the end surface 35 may likewise be covered with a reflective material such as a metallic coating or a mirror, such as to ensure that all light is emitted through the light exit surface 32.

The remaining surfaces 43, 44, 45 and 46 of the second light guide 4 may be provided with a reflective material such as a metallic coating or a mirror, such as to ensure that all light is emitted through the light exit surface 42.

The reflective material may be arranged in direct contact with the respective light guide surface, but is in embodiments arranged such that an air gap is provided between the reflective material and the respective light guide surface.

Still referring to FIG. 9, the light emitting device 1 shown comprises a number of further features and elements, which are optional and which will be described in the following.

The coupling of light from the light source 2 into the first light guide 3 may be improved by means of an appropriate coupling structure 7 provided on the light input surface 31 of the first light guide and/or by means of a coupling medium 8 arranged between the light source 2 and the first light guide. In principle more than one coupling structure and/or coupling medium may be provided. Suitable coupling structures 7 and coupling media 8 are described above.

The first light guide 3 and the second light guide 4 are connected to each other by means of a layer 6 having a relatively low refractive index, meaning a refractive index which is lower than that of both light guides. The layer 6 may be air, in which case spacers may be used to maintain the air gap, or it may be made of materials like e.g. silicones (n=1.4-1.5) or silicate-based sol-gel material (n=1.3-1.6).

Figure 10:
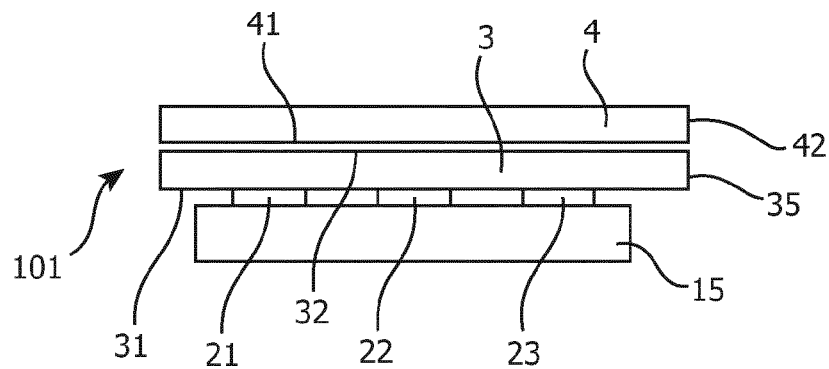
FIG. 10 shows a cross sectional side view of a light emitting device according to a second embodiment of the invention.

Turning now to FIG. 10 a second embodiment of a light emitting device 101 according to the invention is shown. In this embodiment the light source comprises a plurality of LEDs 21, 22, 23 arranged in an array on a base 15 such as a printed circuit board (PCB).

Furthermore, in this embodiment the first light guide 3 is adapted for converting the light with the first spectral distribution emitted by the LEDs 21, 22, 23 to light with a third spectral distribution being different from both the first spectral distribution and the second spectral distribution to which light is converted by the second light guide 4.

By way of a non-limiting example, the LEDs may emit blue light, while the first and second light guide 3, 4 are adapted for converting incoming light to green and red light respectively. Thus, in this example blue light is coupled into the first light guide 3 where it is converted to green light, and green light from the first light guide 3 is coupled into the second light guide 4 where it is converted to red light. Hence, green light is emitted through the end surface 35, while red light is emitted through the second light exit surface 42. In an embodiment, all light coupled into one of the light guides is converted. In the alternative where some light is left unconverted, the unconverted light may be emitted through e.g. the above-mentioned end surface 35 and second light exit surface, respectively.

In this embodiment, both the first light guide 3 and the second light guide 4 are luminescent light guides.

Figure 11:
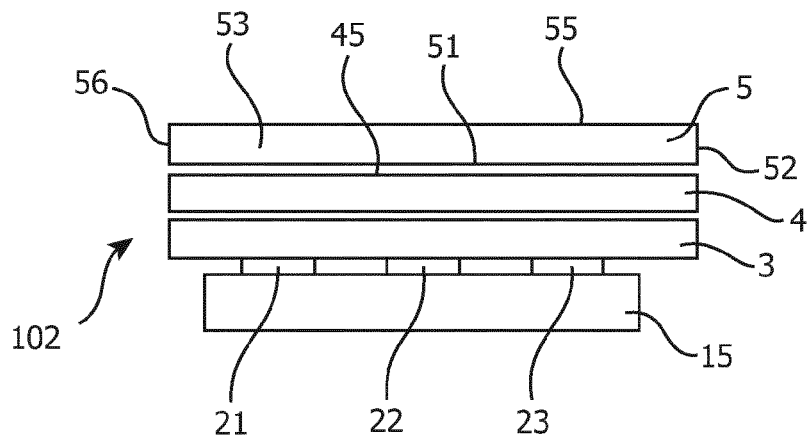
FIG. 11 shows a cross sectional side view of a light emitting device according to a third embodiment of the invention.

FIG. 11 shows a third embodiment of a light emitting device 102 according to the invention. In this embodiment the light source comprises a plurality of LEDs 21, 22, 23 arranged in an array on a base 15 such as a PCB.

Furthermore, the first light guide 3 is adapted for converting the light with the first spectral distribution emitted by the LEDs 21, 22, 23 to light with a third spectral distribution being different from both the first spectral distribution and the second spectral distribution to which light is converted by the second light guide 4.

The light emitting device 102 shown in FIG. 11 also comprises a further light guide 5 comprising a further light input surface 51 and a further light exit surface 52. The further light guide 5 is adapted for receiving and coupling in incident light at the further light input surface 51, converting the incident light to converted light with a spectral distribution being different from that of the incident light, guiding converted and/or incident light to the further light exit surface 52 and coupling the converted and/or incident light out of the further light exit surface 52. Of course, more than one further light guide may be provided.

The further light guide 5 is likewise shaped generally as a bar or rod having a further light input surface 51, a further light exit surface 52 being an end surface of the further light guide 5 and extending perpendicular to the further light input surface 51 as well as four further surfaces of which the surfaces 53, 55 and 56 are shown in the side view of FIG. 10, whereas the surface extending in parallel with and opposite to the surface 53 is not visible in FIG. 10. The further light guide 5 may also be plate shaped, e.g. as a square or rectangular plate.

The light coupled into the further light guide 5 through the further light input surface 51 shown in FIG. 11 is light emitted, or escaping, through the surface 45 of the second light guide 4.

In an embodiment, the further light guide 5 is a luminescent light guide, which absorbs incident light and converts it to light having a spectral distribution, which is in embodiments different from the first, second and third spectral distributions described above. That is, the first light guide 3, the second light guide 4 and the further light guide 5 all have different luminescent properties, e.g. they are made of different luminescent materials such as different phosphors, suitable examples described above.

In an example the first light guide 3 is a transparent light guide, while the second light guide 4 and the further light guide 5 are luminescent light guides converting incoming light to green and red light, respectively. Alternatively, all three light guides 3, 4 and 5 may be luminescent light guides, e.g. converting incoming light to yellow, green and red light, respectively.

The remaining surfaces 53, 55 and 56 as well as the not visible surface opposite the surface 53 of the one or more further light guides 5 may be provided with a reflective material such as a metallic coating or a mirror, such as to ensure that all light is emitted through the light exit surface 52. The reflective material may be arranged in direct contact with the respective light guide surface, but is in embodiments arranged such that an air gap is provided between the reflective material and the respective light guide surface.

In embodiments comprising more than one further light guide 5, for example being luminescent light guides, each further light guide converts incident light to light having a spectral distribution being different from the spectral distributions of light emitted from any other light guide of the light emitting device and being different from the first spectral distribution of the light emitted by the light sources. It is, however, also feasible to provide two or more light guides emitting light having the same spectral distribution, thus increasing the intensity of light emitted with that particular spectral distribution.

Figure 12:
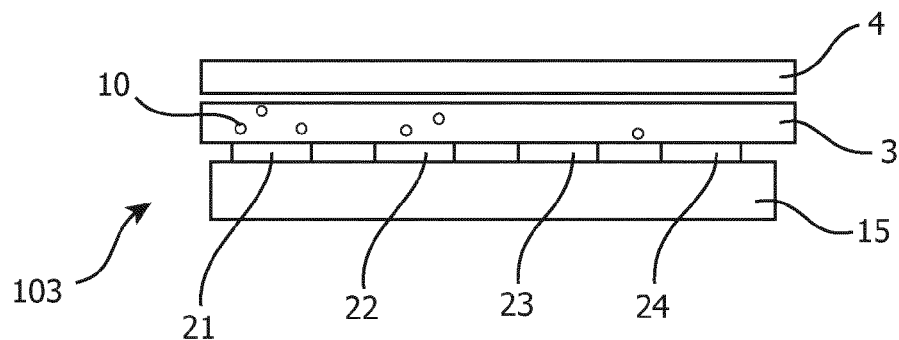
FIG. 12 shows a cross sectional side view of a light emitting device according to a fourth embodiment of the invention.

FIG. 12 shows a fourth embodiment of a light emitting device 103 according to the invention and being very similar to the one shown in FIG. 9 and described above.

The light emitting device 103 shown in FIG. 12 differs from the remaining embodiments described herein in that the first light guide 3 comprises scattering elements 10. The scattering elements 10 may e.g. be particles of materials such as $TiO_2$, $Al_2O_3$ or $BaSO_4$ and are intended to improve the extraction of light from the first light guide 3. The thus extracted light can then be absorbed by the second light guide 4 and converted to light with a second spectral range.

The second light guide 4 and, where present, any further light guide 5 may likewise be provided with scattering elements 10.

Figure 13:
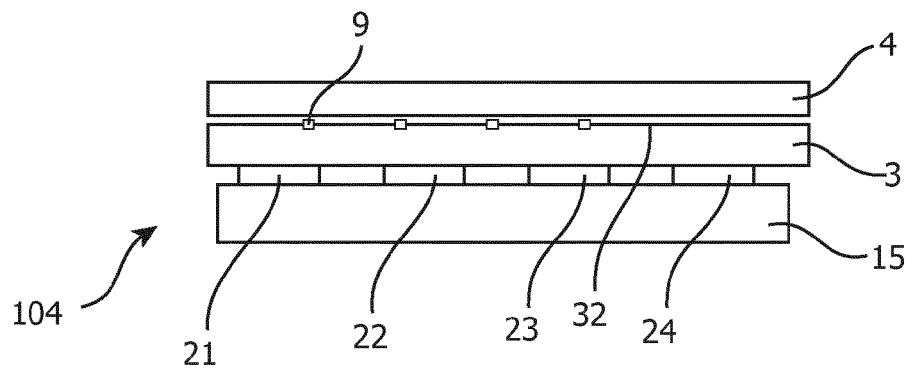
FIG. 13 shows a cross sectional side view of a light emitting device according to a fifth embodiment of the invention.

FIG. 13 shows a fifth embodiment of a light emitting device 104 according to the invention and being very similar to the one shown in FIG. 9 and described above.

The light emitting device 104 shown in FIG. 13 differs from the remaining embodiments described herein in that the first light guide 3 comprises a coupling structure 9, such as a grating or a photonic crystal, for coupling light out of the first light guide 3. The thus extracted light can then be absorbed by the second light guide 4 and converted to light with a second spectral range. The coupling structure is in an embodiment arranged on the first light exit surface 32 of the first light guide 3. Alternatively the coupling structure 9 may be embedded in the first light guide adjacent to the first light exit surface 32.

The second light guide 4 and, where present any further light guide 5 may likewise be provided with a coupling structure 9, in an embodiment being arranged on or embedded in the respective light exit surface thereof.

Figure 14:
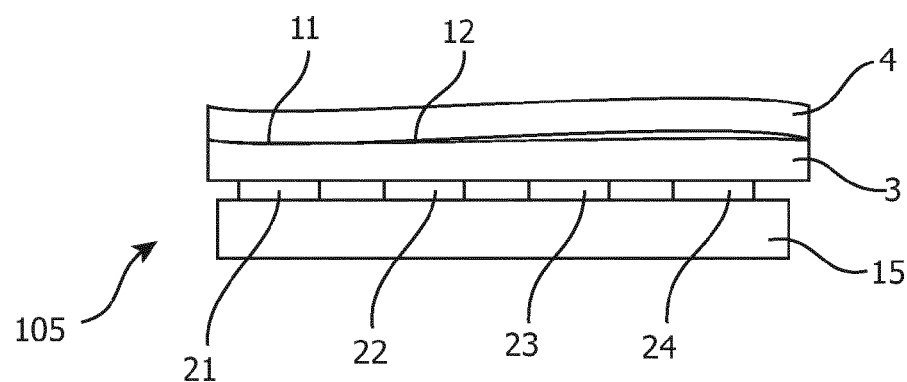
FIG. 14 shows a cross sectional side view of a light emitting device according to a sixth embodiment of the invention.

FIG. 14 shows a sixth embodiment of a light emitting device 105 according to the invention and being very similar to the one shown in FIG. 9 and described above.

The light emitting device 105 shown in FIG. 14 differs from the remaining embodiments described herein in that the first light guide 3 is arranged such as to be partly in optical and/or mechanical contact with the second light guide 4. As shown in FIG. 14, the first light guide 3 is in optical and/or mechanical contact with the second light guide 4 at the two specific points 11, 12. Thereby an improved coupling of light from the first light guide 3 to the second light guide 4 is obtained which in turn lower or even eliminates light losses.

In an alternative the first light guide 3 may be arranged such as to be partly in optical and/or mechanical contact with the second light guide 4 over an area of the respective adjoining surfaces. In another alternative the first light guide 3 is arranged such as to be in optical and/or mechanical contact with the second light guide 4 over all of the area of the respective adjoining surfaces.

When one or more further light guides 5 is/are provided, the second light guide 4 and the further light guide 5, and/or neighboring respective further light guides, may likewise be arranged such as to be at least partly in optical and/or mechanical contact with each other.

Figure 15:
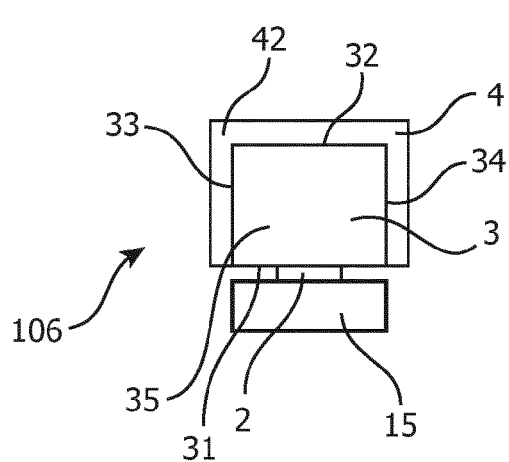
FIG. 15 shows a cross sectional end view of a light emitting device according to a seventh embodiment of the invention.

FIG. 15 shows a seventh embodiment of a light emitting device 106 according to the invention and being very similar to the one shown in FIG. 9 and described above.

The light emitting device 106 shown in FIG. 15 differs from the remaining embodiments described herein in that the first light guide 3 is partly enclosed by the second light guide 4. Thereby light emitted from the first light guide 3 may be collected from more than one surface, particularly and as shown in FIG. 14 the surfaces 31, 33 and 34, of the first light guide 3, thus further lowering or even eliminating light losses.

In an alternative embodiment the first light guide 3 may also be fully enclosed by the second light guide 4. In other alternative embodiments the second light guide 4 may be partly or fully enclosed by the first light guide 3. Furthermore, in embodiments comprising a further light guide 5, analogous embodiments are feasible, for instance the first light guide 3 and the second light guide 4 may be partially or fully enclosed by the further light guide 5.

Figure 16:
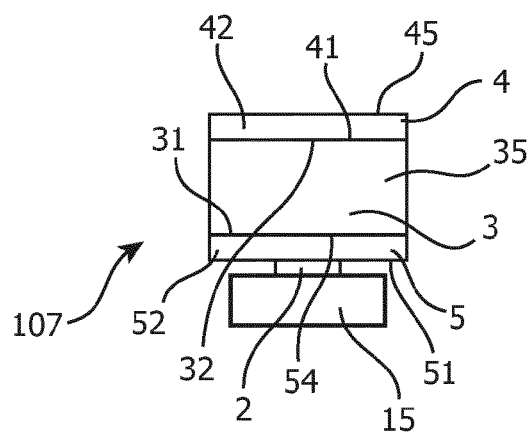
FIG. 16 shows a cross sectional end view of a light emitting device according to an eighth embodiment of the invention.

FIG. 16 shows an eighth embodiment of a light emitting device 107 according to the invention and being very similar to the one shown in FIG. 9 and described above.

The light emitting device 107 shown in FIG. 16 differs from the remaining embodiments described herein in that a further light guide 5 is provided between the light source 2 and the first light guide 3 and comprising a further light input surface 51 and a further light exit surface 54. In other words, the first light guide 3 is sandwiched between the further light guide 5 and the second light guide 4.

In this embodiment, the further light guide 5 and the second light guide 4 are for example identical light guides, but may in principle also be different light guides.

The further light guide 5 is adapted for receiving and coupling in incident light emitted by the light source 2 at the further light input surface 51, converting the incident light to converted light with a spectral distribution being different from that of the incident light, guiding converted and/or incident light to the further light exit surface 54 and coupling the converted and/or incident light out of the further light exit surface 54 and into the first light guide 3 through the first light input surface 31. Of course, more than one further light guide may be provided between the light source 2 and the first light guide 3.

In embodiments, the further light guide 5 is a luminescent light guide, which absorbs incident light and converts it to light having a spectral distribution, which is for example different from the first, second and third spectral distributions described above.

In embodiments also light exits the further light guide via a further end surface 52. The remaining surfaces of the one or more further light guides 5 may be provided with a reflective material such as a metallic coating or a mirror, such as to ensure that all light is emitted through the light exit surface(s).

The light guides of the light emitting device according to the invention may be equipped with a suitable optical element as described above with reference to FIG. 2.

Additionally, or alternatively, suitable heat sink elements may be arranged at the light guides of the light emitting device according to the invention, for example as described above with reference to FIGS. 6A and 6B, thereby improving the heat removal of the light emitting device.

In embodiments the light emitting device may be arranged to emit polarized light, such as described above with reference to FIGS. 7A-7D, which is for example useful for use in a digital projector.

In order to further increase the intensity of the emitted light, the light guides of the light emitting device according to the invention may have a tapered exit surface such as described with reference to FIG. 8 above.

The person skilled in the art realizes that the present invention by no means is limited to the embodiments described above. On the contrary, many modifications and variations are possible within the scope of the appended claims.

Particularly, the various elements and features of the various embodiments described herein may be combined freely.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:
   a light source adapted for, in operation, emitting light with a first spectral distribution,
   a first light guide comprising a first light input surface and a first light exit surface arranged opposite to one another, and further comprising an end surface extending perpendicular with respect to the first light input surface, and
   a second light guide comprising a second light input surface and a second light exit surface extending perpendicular with respect to one another,
   the first light guide being adapted for receiving the light with the first spectral distribution from the light source at the first light input surface, guiding the light with the first spectral distribution to the first light exit surface and to the end surface and coupling a part of the light with the first spectral distribution out of the first light exit surface into the second light guide and coupling another part of the light with the first spectral distribution out of the end surface, and
   the second light guide being adapted for receiving light with the first spectral distribution coupled out of the first light guide at the second light input surface, guiding the light to the second light exit surface, converting at least a part of the light with the first spectral distribution to light with a second spectral distribution and coupling the light with the second spectral distribution out of the second light exit surface.

2. A light emitting device according to claim 1, wherein the first light guide is a transparent light guide.

3. A light emitting device according to claim 1, wherein the first light guide is a transparent substrate and the light source is a solid state light source manufactured on or in the transparent substrate.

4. A light emitting device according to claim 1, the first light guide further being adapted for converting at least a part of the light with the first spectral distribution to light with a third spectral distribution and guiding the light with the third spectral distribution to the first light exit surface and to the end surface and coupling a part of the light with the third spectral distribution out of the first light exit surface into the second light guide and coupling another part of the light with the third spectral distribution out of the end surface, and
   the second light guide being adapted for receiving at least a part of the light with the third spectral distribution coupled out of the first light guide at the second light input surface, guiding the light to the second light exit surface, converting at least a part of the light with the third spectral distribution to light with the second spectral distribution and coupling the light with the second spectral distribution out of the second light exit surface.

5. A light emitting device according to claim 1, wherein one of the first light guide and the second light guide is at least partly enclosed by the respective other of the first light guide and the second light guide.

6. A light emitting device according to claim 1, and further comprising one or more further light guides arranged on the second light guide and comprising a further light input surface and a further light exit surface extending perpendicular with respect to one another,
   the one or more further light guides being adapted for receiving and coupling in incident light from the second light guide at the further light input surface, guiding the incident light to the further light exit surface, converting at least a part of the incident light to converted light with a spectral distribution being different from that of the incident light and coupling the converted light out of the further light exit surface.

7. A light emitting device according to claim 1, further comprising a further light guide arranged in between the light source and the first light guide and comprising a further light input surface and a further end surface extending perpendicular with respect to one another, and a further light exit surface opposite to the further light input surface,
   the further light guide being adapted for receiving and coupling in incident light from the light source, converting at least a part of the incident light to converted light with a spectral distribution being different from that of the incident light, guiding the incident light and/or the converted light to the further light exit surface and to the further end surface, coupling the incident light and/or the converted light out of the further light exit surface into the first light guide and out of the further end surface.

8. A light emitting device according to claim 1, wherein the first light input surface of the first light guide comprises a coupling structure.

9. A light emitting device according to claim 8, wherein the coupling structure is any one of a refractive structure and a diffractive structure.

10. A light emitting device according to claim 1, further comprising a layer arranged between the first light guide and the second light guide, the layer being of a material having a refractive index, which is lower than the refractive index of both the first light guide and the second light guide.

11. A light emitting device according to claim 1, wherein the second light guide comprises a luminescent material.

12. A light emitting device according to claim 1, wherein any one or more of the first light guide and the second light guide comprise at least one scattering element.

13. A light emitting device according to claim 1, wherein any one or more of the first light guide and the second light guide comprise a coupling structure at the first light exit surface and the second light exit surface, respectively.

14. A light emitting device according to claim 1, wherein the first light guide and the second light guide are at least partially in one or more of optical and mechanical contact with one another.

15. A digital projection device comprising a light emitting device according to claim 1.

* * * * *